(12) United States Patent
Lecornet et al.

(10) Patent No.: US 6,210,086 B1
(45) Date of Patent: Apr. 3, 2001

(54) DEVICE FOR REMOVING CHIPS PRODUCED BY THE MACHINING HEAD OF A MACHINE TOOL

(75) Inventors: Alain Lecornet, Montigny en Gohelle; Bernard Lokietek, Leforest; Jean-Michel Meunier, Drancy; Jean-Paul Rocher, Elancourt, all of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/147,541

(22) PCT Filed: Jul. 11, 1997

(86) PCT No.: PCT/FR97/01274

§ 371 Date: Apr. 14, 1999

§ 102(e) Date: Apr. 14, 1999

(87) PCT Pub. No.: WO98/03301

PCT Pub. Date: Jan. 29, 1998

(30) Foreign Application Priority Data

Jul. 19, 1996 (FR) .................................................. 96 09069

(51) Int. Cl.$^7$ ...................................................... B23Q 11/00
(52) U.S. Cl. ............................................. 409/137; 408/67
(58) Field of Search ..................................... 409/135, 136, 409/137; 408/56, 61, 62, 63, 67; 134/180, 181; 239/557, 559

(56) References Cited

U.S. PATENT DOCUMENTS

| | | | |
|---|---|---|---|
| 3,054,411 | * | 9/1962 | Randall ................................. 134/111 |
| 3,601,136 | * | 8/1971 | Marcham ............................. 134/181 |
| 3,645,791 | * | 2/1972 | Sadwith ............................. 134/25 A |
| 4,082,057 | * | 4/1978 | Hayes ......................................... 118/9 |
| 4,185,376 | * | 1/1980 | Johnstone ............................... 29/268 |
| 4,244,524 | * | 1/1981 | Wellings .............................. 134/167 |
| 4,322,992 | * | 4/1982 | Remillard et al. ..................... 408/56 |
| 4,778,315 | * | 10/1988 | Duffy et al. ......................... 409/136 |
| 4,893,642 | * | 1/1990 | Parslow, Jr. et al. ................. 134/66 |
| 4,989,785 | * | 2/1991 | Walendowski ...................... 239/227 |
| 5,205,686 | * | 4/1993 | De Caussin ......................... 409/131 |
| 5,678,466 | * | 10/1997 | Wahl ...................................... 83/168 |
| 5,683,210 | * | 11/1997 | Phillips et al. ...................... 409/137 |

* cited by examiner

Primary Examiner—Daniel W. Howell
(74) Attorney, Agent, or Firm—Oblon, Spivak, McClelland, Maier & Neustadt, P.C.

(57) ABSTRACT

A device for removing chips produced by a machining head. A pressurized liquid supply pipe is connected to a dispenser for spraying the machine tool so that the liquid carries the chips into a discharge area. The dispenser consists of at least one multidirectional nozzle for spraying liquid throughout the space including the main places where the chips fall.

20 Claims, 2 Drawing Sheets

DEVICE FOR REMOVING CHIPS PRODUCED BY THE MACHINING HEAD OF A MACHINE TOOL

BACKGROUND OF THE INVENTION

1. Field of the Invention

The present invention relates to machine tools, and is directed more particularly at a device which makes it possible to remove and evacuate the chips formed and ejected during machining of a part.

2. Discussion of the Background

In classical equipment, the chips formed during machining of a part are flushed from the zone of the cutting tool by liquid jets emerging from directional nozzles disposed nearby and oriented toward the tool and the tool holder. The chips drawn along by the liquid are then collected together therewith in an evacuation housing disposed in the lower part of the machine tool.

Nevertheless, such devices suffer from the drawback of allowing the chips to accumulate in the form of agglomerate in the multiple ejection zones not sprayed by the liquid jets. These agglomerates are particularly heavy during high-speed machining of materials such as aluminum-base materials, for which the chips, which are of small size, are ejected into the entire space surrounding the tool and the part to be machined. Agglomerates of chips hardened and stuck to the surrounding walls then break off randomly and interfere with machining of the part in progress, making it necessary to stop and clean the machine tool.

One known technique for overcoming this drawback is to increase the number of liquid-atomizing nozzles and to orient the nozzles toward the points of heaviest accumulation of chips.

This solution involves a greater number of liquid-supply tubes and an increase in space requirement and weight of the device, with all the associated drawbacks when the said device must be fixed on removable hoods for maintenance operations. Furthermore, the greater number of liquid-atomizing nozzles leads to an increase of liquid consumption and achieves merely a shift in the chip-accumulation zones, which still become grouped behind the nozzles.

SUMMARY OF THE INVENTION

The object of the present invention is therefore to remove the chips ejected by a machine tool by means of a device which requires little space, is simple to install without the possibility of loss of adjustment, is economical as regards liquid consumption, is effective within a large radius of action and can be manufactured simply and economically.

The device according to the invention for removal of chips ejected by the machining head of a machine tool comprises at least one pressurized-liquid delivery line connected to distributor means suitable for spraying the machine tool in order to draw the chips together with the liquid toward an evacuation outlet.

According to the invention, the device for removal of chips ejected by the machining head of a machine tool is characterized in that the distributor means are achieved by at least one nozzle of multidirectional type capable of atomizing the liquid throughout an appropriate spraying volume, said volume comprising the main zones of deposition of ejected chips.

According to another characteristic of the invention, the multidirectional nozzle is provided with a head having orifices which atomize substantially straight liquid jets, the head being mounted movably in such a way that the jets periodically sweep over the entirety of the volume.

According to another characteristic of the invention, the multidirectional nozzle is provided with a rotary head.

According to another characteristic of the invention, the rotary head is of the automatically turning type, wherein the torque generated by atomization of the liquid drives the head in rotation.

According to yet another characteristic of the invention, the rotary head has spherical shape and is provided with multiple tangentially oriented orifices.

According to another characteristic of the invention, the rotary head is of the whirling type.

According to another characteristic of the invention, the multidirectional nozzle is disposed in such a way that it directly sprays the tool under a favorable angle.

According to another characteristic of the invention, the machining head of the machine tool as well as the part and the multidirectional nozzle are disposed in the same closed enclosure.

According to another characteristic of the invention, the machine tool is a high-speed machining machine with high feed speeds.

According to another characteristic of the invention, the pressurized liquid is a soluble oil which is atomized by the multidirectional nozzle throughout the duration of machining.

BRIEF DESCRIPTION OF THE DRAWINGS

The objects, aspects and advantages of the present invention will be better understood from the description given hereinafter of an embodiment of the invention, presented by way of non-limitative example with reference to the attached drawings, wherein.

DETAILED DESCRIPTION OF THE PREFERRED EMBODIMENTS

To facilitate reading of the drawings, like parts are denoted by like reference symbols from one figure to the other. In addition, only the elements necessary for understanding of the invention are illustrated.

Figure 1:
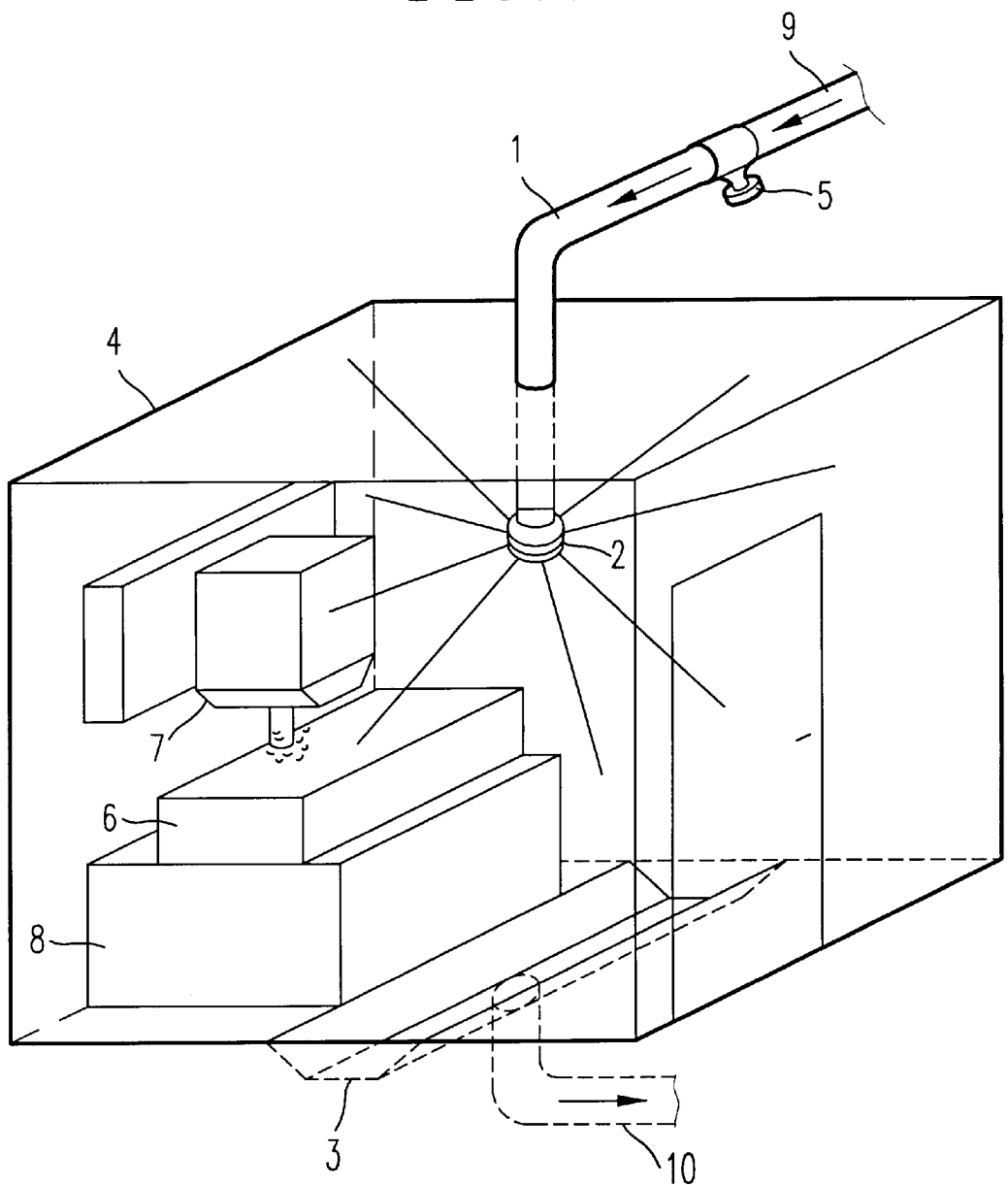
FIG. 1 is a perspective schematic diagram of a device according to the invention for removal of chips ejected by a machine tool.

The device shown in FIG. 1 for removal of chips comprises a tube 1 connected on the one hand to a general system 9, which supplies tool-spraying liquid such as soluble oil under a pressure of at least 2 bar, and on the other to a multidirectional spray nozzle 2 of automatically turning type, disposed inside an enclosure 4 and atomizing liquid through 360°.

Enclosure 4 contains a machine tool provided with a work-holder mount 8 and a machining head 7, which can produce numerous chips during machining of a part 6. The machine tool is provided in its lower part with a trough 3 for recovery of spray liquid and chips. This trough 3, which is disposed at the lower level of enclosure 4 and is connected to an evacuation tube 10, can be provided, for example, with inclined planes on both sides of its opening in order to improve recovery of the liquid and chips.

According to the particular embodiment of the device presented in FIG. 1 for removal of the chips, enclosure 4 is closed in such a way as to limit ejection of chips and of spray liquid to a given volume, the said volume being adapted in such a way as to permit easy maintenance of the elements of the machine tool such as machining head 7 and work-holder mount 8.

The position and length of tube 1 present in enclosure 4 are adapted such that multidirectional nozzle 2 disposed at the end of tube 1 has sufficient clearance to permit direct spraying of a maximum volume of enclosure 4.

In addition, the placement of multidirectional nozzle 2 can be chosen so as to favor spraying of machining head 7, of part 6 to be machined and of work-holder mount 8. Thus multidirectional nozzle 2 can be disposed, for example, in the upper part of enclosure 4 in such a way that it sprays the machining zone at an angle favorable for drawing the maximum of chips toward recovery trough 3.

On the outside of enclosure 4 a solenoid valve 5 is disposed in tube 1 downstream from the connection to the general system which supplies the spray liquid. This solenoid valve 5 is connected to the automatic control system of the machine tool in such a way that the spraying of liquid in enclosure 4 is synchronized with the machining of part 6.

Such a device makes it possible in simple manner to control the problem of deposits of chips in the machining zone of a machine tool. This device is particularly effective in the case of high-speed machining operations producing numerous chips of small size which are then ejected into the entire surrounding space.

In fact, in contrast to classical devices with directional nozzles, the atomization of the liquid by multidirectional nozzle 2 accompanied by reflection of the liquid jets on the walls of enclosure 4 permits complete spraying of the volume of enclosure 4. Thus the chips ejected into the entire volume of enclosure 4 are rapidly sprayed and drawn along by the liquid toward evacuation trough 3. The use of an automatically turning multidirectional nozzle 2 additionally makes it possible to achieve spurt-like ejection of liquid to a given point of enclosure 4, thus contributing to increasing the effectiveness of the jet in detaching the chips from the walls.

Such a device makes it possible with a single multidirectional nozzle 2 to achieve an effectiveness greater than that of a classical device with larger number of directional nozzles while also requiring less liquid consumption. The device according to the invention also has the advantage of being simple to install, since it needs only one single liquid-delivery tube.

Of course, FIG. 1 illustrates only one particular embodiment of the device according to the invention for removal of chips, and it is possible to imagine replacing enclosure.4 by suitable fairing of certain zones in such a way that ejection of chips or of liquid can be limited.

Another conceivable option is to increase the number of multidirectional nozzles 2 in order to adapt the spray volume to the machine tool. Similarly, the supply pressure of tube 1 with spray liquid and the flowrate of multidirectional nozzle 2 will be chosen as a function of the quantity and nature of the chips produced by machining head 7 of the machine tool.

Figure 2:
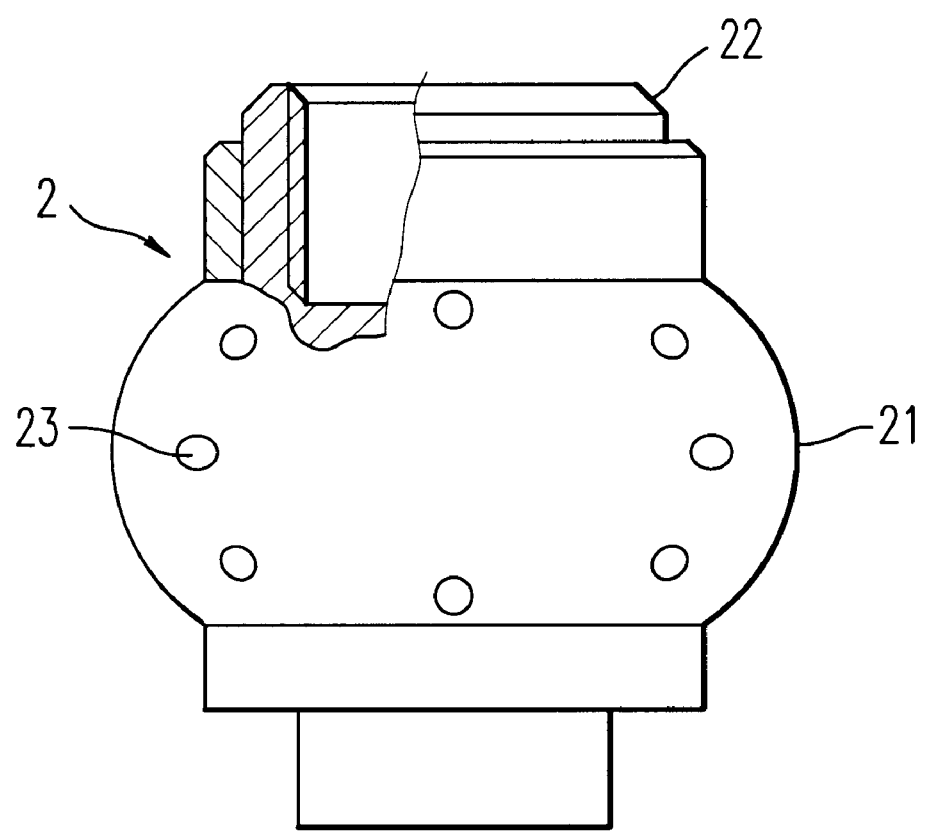
FIG. 2 is a front view of a multidirectional nozzle that can be used for the device according to the invention.

FIG. 2 shows a multidirectional nozzle which can be used for the device according to the invention for removal of chips. This nozzle of automatically turning type, reference number 583.269.55, distributed by the LECHLER Co., has a collar 21 mounted to rotate around a body 22. Collar 21 is perforated with orifices 23 which permit atomization of the liquid while collar 21 is simultaneously driven in rotation. The atomization of the liquid by multiple orifices 23, in combination with the rotation of the collar, makes it possible to achieve ejection of liquid in the entire space surrounding multidirectional nozzle 2.

Of course, the invention is in no way limited to the described and illustrated embodiments, which have been provided only by way of examples.

To the contrary, the invention comprises all the technical equivalents of the described means as well as combinations thereof if such are made within the spirit of the invention.

Thus, the nozzle of FIG. 2 may be replaced by any other type of multidirectional nozzle, such as a nozzle of the whirling head type or even a nozzle with a fixed head having multiple orifices.

What is claimed is:

1. A device for removal of chips ejected by a machining head of a machining tool, said device comprising
    at least one pressurized-liquid delivery line configured to deliver liquid;
    means for evacuating the liquid and the chips; and means for distributing the liquid, said distributor means being connected to said at least one pressurized-liquid delivery line, said distributor means being configured to spray the machine tool with the liquid in order to draw the chips together with the liquid toward the evacuation means, said distributor means including at least one multidirectional nozzle configured to atomize the liquid throughout a spraying volume, said volume comprising main zones of deposition of ejected chips from said machining head, wherein said multidirectional nozzle is provided with a head having orifices which atomize substantially straight liquid jets, said head being mounted movably such that the jets periodically sweep over an entirety of said volume.

2. A device according to claim 1 wherein said multidirectional nozzle is provided with a rotary head.

3. A device according to claim 2 wherein said rotary head is configured such that a torque generated by atomization of the liquid automatically drives said head in rotation.

4. A device according to claim 3 wherein said rotary head has a spherical shape and is provided with multiple tangentially oriented orifices.

5. A device according to claim 2 wherein said rotary head is a whirling rotary head.

6. A device according to claim 1 wherein the multidirectional nozzle is disposed such that the multidirectional nozzle directly sprays the tool at an angle favorable for drawing the chips towards the evacuation means.

7. A device according to claim 1 wherein the machining head, a part and the multidirectional nozzle are disposed in a same closed enclosure.

8. A device according to claim 1 wherein said machine tool is a high-speed machining machine.

9. A device according to claim 1 wherein the pressurized liquid is a soluble oil which is atomized by the multidirectional nozzle throughout a duration of machining.

10. A device according to claim 3 wherein said rotary head is a whirling rotary head.

11. A device according to claim 2 wherein the multidirectional nozzle is disposed such that the multidirectional nozzle directly sprays the tool at an angle favorable for drawing the chips towards the evacuation means.

12. A device according to claim 3 wherein the multidirectional nozzle is disposed such that the multidirectional nozzle directly sprays the tool at an angle favorable for drawing the chips towards the evacuation means.

13. A device according to claim 4 wherein the multidirectional nozzle is disposed such that the multidirectional nozzle directly sprays the tool at an angle favorable for drawing the chips towards the evacuation means.

14. A device according to claim 5 wherein the multidirectional nozzle is disposed such that the multidirectional nozzle directly sprays the tool at an angle favorable for drawing the chips towards the evacuation means.

15. A device according to claim 2 wherein the machining head, a part and the multidirectional nozzle are disposed in a same closed enclosure.

16. A device according to claim 3 wherein the machining head, a part and the multidirectional nozzle are disposed in a same closed enclosure.

17. A device according to claim 4 wherein the machining head, a part and the multidirectional nozzle are disposed in a same closed enclosure.

18. A device according to claim 5 wherein the machining head, a part and the multidirectional nozzle are disposed in a same closed enclosure.

19. A device according to claim 6 wherein the machining head, a part and the multidirectional nozzle are disposed in a same closed enclosure.

20. A device according to claim 2 wherein said machine tool is a high-speed machining machine.

* * * * *